US008262485B2

(12) United States Patent
Lehmann

(10) Patent No.: US 8,262,485 B2
(45) Date of Patent: Sep. 11, 2012

(54) VIBRATION DAMPER FOR A DRIVE TRAIN

(75) Inventor: Martin Lehmann, Hornberg (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/231,660

(22) Filed: Sep. 13, 2011

(65) Prior Publication Data

US 2012/0004043 A1  Jan. 5, 2012

Related U.S. Application Data

(63) Continuation of application No. PCT/DE2010/000261, filed on Mar. 12, 2010.

(30) Foreign Application Priority Data

Mar. 13, 2009 (DE) .......................... 10 2009 013 082
Dec. 11, 2009 (DE) .......................... 10 2009 057 914

(51) Int. Cl.
*F16D 3/76* (2006.01)

(52) U.S. Cl. ........................................... 464/75; 464/91

(58) Field of Classification Search .................. 464/73, 464/74, 75, 51, 89, 91, 92
See application file for complete search history.

(56) References Cited

U.S. PATENT DOCUMENTS

| 1,780,727 | A | * | 11/1930 | Tenney | 464/75 |
|---|---|---|---|---|---|
| 3,345,831 | A | | 10/1967 | Boole | |
| 3,859,821 | A | * | 1/1975 | Wallace | 464/89 |
| 4,098,096 | A | * | 7/1978 | Chard et al. | 464/89 |
| 4,357,137 | A | * | 11/1982 | Brown | 464/75 |
| 5,460,574 | A | | 10/1995 | Hobaugh | |
| 5,956,998 | A | * | 9/1999 | Fenelon | 464/75 X |
| 6,659,819 | B2 | * | 12/2003 | Fuse | 464/73 |
| D513,471 | S | * | 1/2006 | Sato et al. | |
| 6,993,989 | B2 | * | 2/2006 | Oomura et al. | 464/73 X |
| 7,625,290 | B2 | * | 12/2009 | Hodjat et al. | 464/75 |
| 7,670,228 | B2 | | 3/2010 | Matsumoto et al. | |
| 2002/0190450 | A1 | | 12/2002 | Honda et al. | |
| 2004/0198499 | A1 | * | 10/2004 | Kamdem et al. | 464/75 |

(Continued)

FOREIGN PATENT DOCUMENTS

DE  1 475 519 A1  5/1969

(Continued)

OTHER PUBLICATIONS

International Search Report with English translation dated Jul. 9, 2010 (six (6) pages).

(Continued)

*Primary Examiner* — Gregory Binda
*Assistant Examiner* — Matthieu Setliff
(74) *Attorney, Agent, or Firm* — Crowell & Moring LLP

(57) ABSTRACT

A vibration damper (2) that is effective in the direction of rotation of a drive shaft and has a small radial extension. For this purpose, a first shaft part (6) is provided as a sleeve (8) and a second shaft part (7) is provided as an inner part extending axially into the sleeve (8). The two shaft parts (6, 7) engage via rotary drivers in complementary negative profiles (15, 16) of an interposed elastic damper part (10) in the direction of rotation. In addition to the negative profiles, the damper part may be provided with recesses (40) which modify its damping characteristics.

10 Claims, 16 Drawing Sheets

U.S. PATENT DOCUMENTS

2005/0192103 A1     9/2005    Hauck
2006/0205293 A1*   9/2006    Fuse ........................ 464/73 X

FOREIGN PATENT DOCUMENTS

| | | |
|---|---|---|
| DE | 1 575 892 A1 | 7/1970 |
| DE | 2 336 121 A1 | 2/1974 |
| DE | 25 42 948 A | 3/1977 |
| DE | 93 13 417.7 U1 | 12/1993 |
| DE | 44 26 371 A1 | 2/1996 |
| DE | 196 09 591 A1 | 8/1997 |
| DE | 298 06 632 U1 | 10/1998 |
| DE | 197 55 307 A1 | 2/1999 |
| DE | 601 28 851 T2 | 2/2008 |
| DE | 10 2007 025 953 A1 | 3/2008 |
| EP | 0 141 003 A1 | 5/1985 |
| EP | 1 146 248 A1 | 10/2001 |
| FR | 1 128 208 A | 1/1957 |
| FR | 2 293 625 A1 | 7/1976 |
| GB | 1 528 465 A | 10/1978 |
| GB | 2 310 028 A | 8/1997 |

OTHER PUBLICATIONS

German Search Report with partial English translation dated Oct. 9, 2009 (nine (9) pages).

* cited by examiner

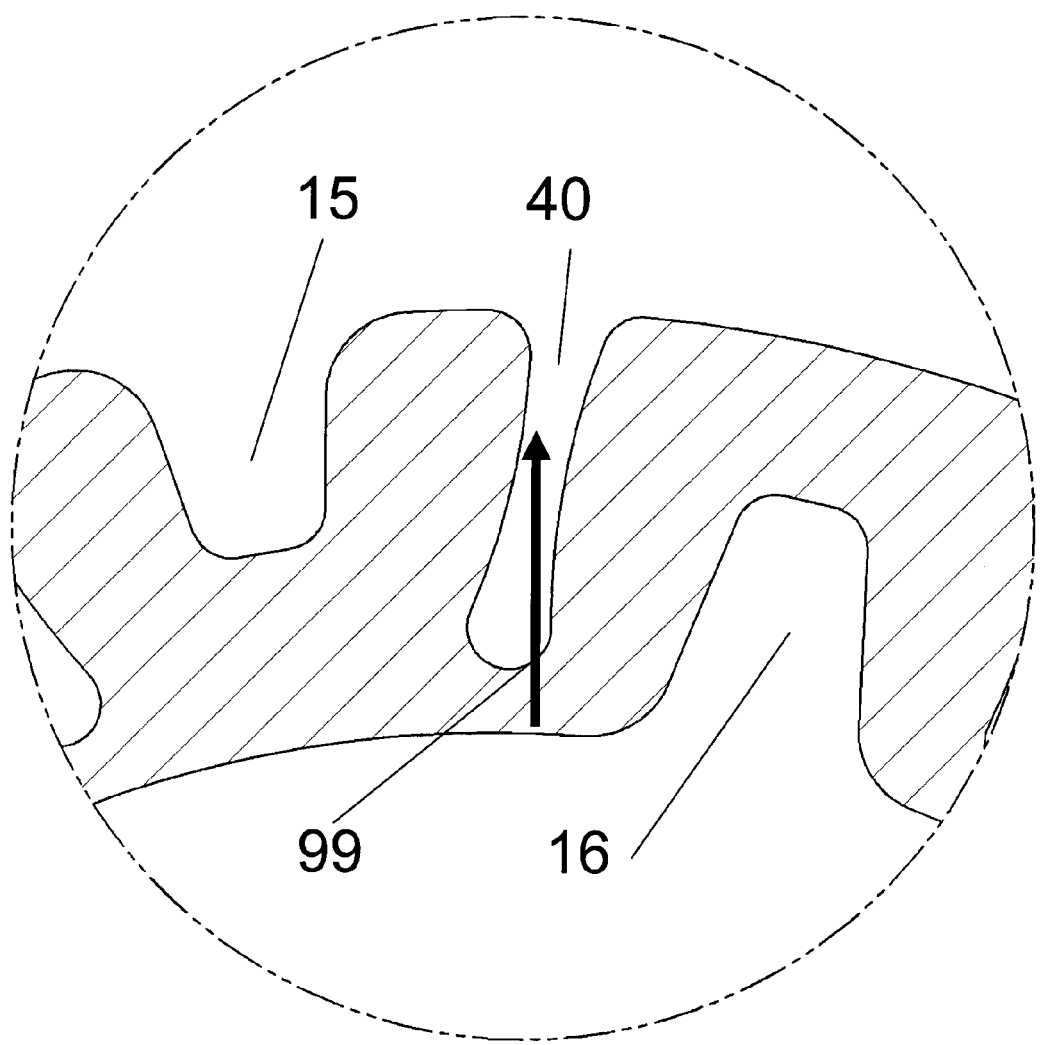

10
15
16

40
41

VIBRATION DAMPER FOR A DRIVE TRAIN

CROSS REFERENCE TO RELATED APPLICATIONS

This application is a continuation of international patent application no. PCT/DE2010/000261, filed Mar. 12, 2010, designating the United States of America and published in German on Sep. 16, 2010 as WO 2010/102611, the entire disclosure of which is incorporated herein by reference. Priority is claimed based on Federal Republic of Germany patent application nos. DE 10 2009 013 082.9, filed Mar. 13, 2009, and DE 10 2009 057 914.1, filed Dec. 11, 2009, the entire disclosures of which are likewise incorporated herein by reference.

BACKGROUND OF THE INVENTION

The invention relates to a vibration damper for a shaft of a drive train, which shaft comprises a first shaft part and a second shaft part and an elastically deformable damping part, which is disposed between the shaft parts and which is acted upon by each of the two shaft parts in a rotationally locked manner, the first shaft part comprising a sleeve comprising radially inwardly oriented rotary drivers for the damping part, the second shaft part comprising an inner part comprising radially outwardly oriented rotary drivers for the damping part, the sleeve and the inner part being constructed and mated to each other in such a way that an end region of the inner part is surrounded by the sleeve, the damping part being disposed radially between the sleeve and the inner part with the damping part surrounding the end region of the inner part, and the damping part comprising negative profiles, with which the rotary drivers engage.

Special vibration dampers are known as so-called Hardy disks or flexible disks in the prior art. German utility model no. DE 93 13 417 U1 shows a corresponding structure thereof. Here, two radially expanded flange parts that are each disposed on a shaft part or another part transferring the rotation of the shaft are connected in an alternating manner over the circumference to an elastic disk made, for example, of rubber/steel or nylon meshwork. The elastic disk serves as a torsional vibration damper for absorbing torsional shocks or vibrations and for compensating a small angular or axial offset between the components associated with the flange parts. In order to be able to transmit the required torque by means of such a damping device, the diameter of the elastic disk must be dimensioned appropriately as a result of the circumferential loads acting upon the elastic disk so that a diameter that is many times that of the shaft must be provided for the damping unit and allowed for in the corresponding installation space. The high surface pressure at the transition points between the flange parts and the elastic disk and the resulting flexing leads to an undesirable heat development and high demands on the stability of the elastic disk.

An active vibration damping of drive shafts is described in EP 1,146,248 (=DE601 28 851). Here, a suitable counter-oscillator is activated in dependence on the measurements of a shaft speed sensor made of a composite material having piezo-electric properties. This construction is very elaborate and cost-intensive.

In the case of jaw clutches, it is known to provide elastic shaped parts between the interlocking jaws [e.g., GB 1,528,465 (=DE 25 42 948) or DE 298 06 632 U1].

Published German patent application no. DE 197 55 307 A1 describes a drive shaft comprising an elastic support that has varying degrees of rigidity in directions extending perpendicularly to each other.

Furthermore, a coupling device comprising two coupling elements is known from U.S. Pat. No. 7,670,228 (=DE 10 2007 025 953) in which one coupling element comprises a tubular circumferential wall into which the arms of the other coupling element extend and which surrounds a damping part.

FR 1,128,208 discloses a likewise solid damping part that is mounted between two shaft sections disposed inside each other, in part.

Thus damping parts for vibration damping are mounted between shaft sections in the prior art, the damping part optionally encompassing a region of a first shaft section, and the second shaft section surrounding the damping part and the region of the first shaft section. The disadvantage of this known arrangement is that the damping characteristics of the solid and homogenously constructed damping parts are solely determined by the properties of the material used for the damping part. Therefore, the damping effect can be specified or adjusted only to a limited extent.

SUMMARY OF THE INVENTION

It is therefore an object of the present invention to provide a vibration damper, of which the damping characteristics are adjustable.

This object is achieved in that the damping part has an inhomogeneous structure and/or a discontinuous geometry.

In one embodiment of the vibration damper of the invention, rotary drivers are provided in the form of longitudinal ribs that extend along the rotation axis of the vibration damper and that engage with the negative profiles constructed in the form of complementary longitudinal grooves in the damping part.

In one embodiment of the vibration damper of the invention, the damping part comprises recesses in addition to the negative profiles. These recesses, in addition to the negative profiles, interrupt the structure of the damping part, and thus also determine the characteristics thereof. As a result of the recesses, the geometry of the outer side of the damping part is not closed like that of a cylinder and is thus not continuous. This design in terms of the geometry can be supplemented by varying the material composition of the damping part by combining different materials. For this purpose, the damping part in one embodiment is composed of strips and/or rings that collectively form the damping part.

In one embodiment of the vibration damper of the invention, recess are provided in the form of grooves extending substantially axially along the rotation axis. In this embodiment, the recesses that are in the form of grooves are thus substantially also longitudinal grooves like the negative profiles in an embodiment. The recesses can be of various forms so that it is also possible for variably shaped groups of recesses to be present together in a damping part. The embodiments of the recesses can thus refer either to individual recesses or to groups of recesses, or to all existing recesses.

In one embodiment of the vibration damper of the invention, the recesses that are in the form of grooves are configured to open in the direction of the sleeve. In this embodiment, the groove-like recesses are thus configured to extend from their base toward the outside in the radial direction.

In another embodiment of the vibration damper of the invention, recesses are provided that are in the form of grooves which are configured to open in the direction of the inner part. In this embodiment, the recesses extend starting from their base toward the inside in the radial direction.

In one embodiment of the vibration damper of the invention, the recesses and the negative profiles are provided so as to alternate with each other radially around the circumference. In one embodiment of the vibration damper of the invention, provision is made for the recesses and the negative profiles to alternate with each other radially around the circumference such that the recesses and the negative profiles open out alternatively in the direction of the sleeve and in the direction of the inner part. In one variant, each recess and negative profile alternate with each other directly. In another variant, different numbers of recesses and negative profiles alternate with each other.

In one embodiment of the vibration damper of the invention, the recesses that are in the form of grooves have substantially the same radial depth as the negative profiles. In another embodiment of the vibration damper of the invention, recesses are provided that are in the form of grooves which have a greater radial depth than the negative profiles.

In one embodiment of the vibration damper of the invention, the recesses that are in the form of grooves have a course that is inclined relative to a surface normal of the damping part.

In another embodiment of the vibration damper of the invention, recesses are provided that are in the form of grooves which have a substantially constant width in the radial direction. In another embodiment of the vibration damper of the invention, the recesses that are in the form of grooves comprise a broader portion in the region of their base.

In one embodiment of the vibration damper of the invention, recesses are provided that are in the form of grooves which are interrupted along the rotation axis, so that the grooves are not completely continuous in the direction of the longitudinal or rotation axis.

In another embodiment, the rotation axis is the axis of symmetry of the damping part.

In one embodiment of the vibration damper of the invention, the rotary drivers and each of the associated negative profiles are constructed and coordinated with each other in such a way that a variable play between the rotary drivers and the respective negative profiles is produced.

In one embodiment of the vibration damper of the invention, the recesses are provided in the form of pockets which abut the negative profiles in the axial direction. In one embodiment of the vibration damper of the invention, at least one filler is provided in the recesses that are in the form of pockets, with the filler being softer than the damping part. In another embodiment of the vibration damper of the invention, the recesses that are in the form of pockets and the filler are constructed and coordinated with each other in such a way that a displacement space is provided for the filler. Under load, the filler can thus fit into the displacement space.

In one embodiment of the vibration damper of the invention, at least part of the negative profiles has, at least in certain sections, an undulated structure in the axial direction. The side walls of the negative profiles are thus undulated along the rotation axis.

In one embodiment of the vibration damper of the invention, the damping part is constructed in the form of a separate component.

In one embodiment of the vibration damper of the invention, the damping part is constructed with a sandwich structure comprising at least two layers of varying elasticity that alternate with each other around the circumference of the damping part. Such layers or—as will be described later—rings may have differing geometries in one embodiment and they may additionally or alternatively be made of different materials. An inhomogeneous structure of the damping part is determined primarily by the different materials that affect the rigidity and damping characteristics of the damping part. The layers or rings and the geometry of the recesses, in particular, are thus options which can be used individually or in combination to adjust the damping behavior.

In one embodiment of the vibration damper of the invention, a layer of lesser elasticity is provided which comprises the negative profiles, and layers of greater elasticity are each be disposed adjacently thereto.

In one embodiment of the vibration damper of the invention, a surface pressure is produced between the rotary drivers and the negative profiles which is higher than the surface pressure between the boundary surfaces and the counter-faces of the layers of varying elasticity.

In one embodiment of the vibration damper of the invention, a damping part is provided which is made of at least two rings disposed one behind the other in the axial direction. In one variant of this embodiment of the vibration damper of the invention, the at least two rings disposed one behind the other in the axial direction have varying elasticity. In another variant embodiment of the vibration damper of the invention, the at least two rings disposed one behind the other in the axial direction may comprise variably shaped recesses one behind the other in the axial direction.

In one embodiment of the vibration damper of the invention, the damping part is fixed or braced axially between the two shaft parts.

In one embodiment of the vibration damper of the invention, the damping part comprises, at least on a front side thereof, an axially elastic damping washer. As a result of the arrangement of the elastic damping part radially between the two shaft parts with an axial length for transmitting torque, it is possible to dispense with flanges, which have a radial diameter that is many times the shaft diameter and between which the elastic damping part is disposed. Since the axial extension of a shaft is given anyway in most applications and therefore not relevant to the installation space, it is possible to save installation space in the radial direction by using the proposed vibration damper of the invention which only marginally expands the shaft diameter. As a result of the improved guidance of the two shaft parts relative to each other, flexing is avoided so that there is reduced development of heat, and therefore higher efficiency is achieved. The vibration damper also has the advantage, for example, that it makes do with less installation space.

A high degree of synchronous operation and balancing quality is achieved by means of the so-called tube-in-tube arrangement of the shaft parts with the damping part. The parts are self-centering on each other so that it is possible to dispense with a centering operation when mounting the shaft parts on each other.

The damping part can be made of a synthetic resin material (plastic), a rubber compound that can be reinforced with fibers or the like, or other elastic materials. In one embodiment, the damping part is a one-piece slide-into-place component. In another embodiment, the damping part is applied, e.g., spray-applied, at least in part to the inner part or to the outer sleeve. In one variant, the damping part is constructed with a sandwich structure comprising at least two layers of varying elasticity that alternate with each other around the circumference of the damping part. According to one illustrative embodiment, it has proved advantageous to produce the damping part from several, preferably two, types of material, for example, in a sandwich technique. In this case, preferably two synthetic resin materials or rubber compounds of varying elasticity can be combined to form a damping part. In one such embodiment the negative profiles are comprised of a layer of lesser elasticity, and layers of greater elasticity are each disposed adjacently thereto. In this case, the material of lesser elasticity and higher strength can form the contact surface for the shaft parts that are preferably made of metal, while the more elastic and less rigid material in contact with the harder material forms damping zones. In this way, the damping part can comprise cylinder segments that are distributed over the circumference and that alternate with each other in terms of their elasticity over the circumference of the damping part and that are oriented substantially along the course of the rotary drivers so that the cylinder segments that operatively engage the rotary drivers and comprise the negative profiles are each made of a material of greater rigidity, and the cylinder segments disposed in between are made of a material having greater elasticity. For example, a surface pressure may be produced between the rotary drivers and the negative profiles which is higher than the surface pressure between the boundary surfaces and counter-faces of the layers of varying elasticity. On the whole, a self-centering is effected very advantageously in this way in that the parts of lesser elasticity achieve the self-centering effect on the sleeve and relative to the inner part, and the parts of greater elasticity can be designed for their damping characteristics and therefore they need not carry out any centering function.

In alternative or additional embodiments, a damping part is provided which is made of at least two rings that are disposed one behind the other in the axial direction and that have varying elasticity, in particular.

In one variant, rotary drivers are provided in the form of longitudinal ribs that are disposed on the sleeve so as to extend along the rotation axis of the vibration damper and that engage with the negative profiles constructed in the form of complementary longitudinal grooves on the damping part. The rotary drivers of the first and second shaft parts can be profiles, which extend radially relative to the shaft in the direction of the damping part and which comprise, at least in part, an axial component and which entrain the damping part in the rotational direction of the shaft by means of this axial component. The torsional or rotary drivers of the first shaft part can alternate with rotary drivers of the second shaft part around the circumference so that the damping part is not weakened by radially opposite rotary drivers. To facilitate simple manufacture of the shaft parts from tubular components by means of a forming process, it has proved advantageous to produce the longitudinal ribs that are distributed around the circumference of the shaft part from the tubing in a forming process. The longitudinal ribs in one embodiment extend substantially parallel to the rotation axis of the shaft parts. Thus these longitudinal ribs together with the negative profiles of the damping part that are preferably in the form of longitudinal grooves form a rotationally-locked interengagement in the rotational direction of the shaft so that any occurrence of vibration in the shaft and consequent rotation of the two shaft parts relative to each other results in a compression particularly of the elastic regions of the damping part in the rotational direction. These elastic regions consume energy by deformation and release the same in the form of heat and/or in the case of a reduction in the relative rotation so that a damping effect is produced in the rotational direction. The type and design of the rotary drivers can be freely selected to a large extent. Thus the longitudinal ribs may have a rectangular or a circular cross-section.

By using variably elastic materials, there preferably results a surface pressure between the rotary drivers and the harder material on the one hand and a surface pressure between the harder material and the more elastic material on the other. The surface ratios between the rotary drivers and the negative profiles are configured to be appropriately smaller than the surface ratios of the different materials of the damping part so that a lesser surface pressure is achieved on the elastic material by means of the selection and arrangement of the different materials, while higher surface pressure and therefore smaller contact surfaces can be achieved by the use of a more rigid material for torque transmission from the shaft parts into the damping part.

In one embodiment the damping part comprises recesses in addition to the negative profiles. In the construction of this embodiment, the recesses are in the form of grooves extending substantially in the axial direction. The vibration damper can be disposed at an almost arbitrary location along the shaft, for example, between two shaft sections or at one end of the shaft. Several vibration dampers can be disposed at a distance from each other axially on a shaft and/or in several shafts of the drive train. For the rotationally locked connection of the vibration damper to shaft sections and/or shaft connections to another shaft, it is possible to provide connection profiles, for example, teeth, threads or the like, on each free end face of the shaft parts. The individual shaft parts can be connected to each other so as to be secure or separable.

It has proved particularly advantageous if the vibration damper comprises an angular compensator and/or an axial displacement unit. In one embodiment, provision is made for a shaft part to be able to pivot about another shaft part from a shaft axis and/or be displaced axially. An angular compensation can be effected, for example, by means of a universal joint or the like, one shaft part being pivotable at an articulation angle relative to a shaft part remaining, for example, in the rotation axis in the form of a shaft axis.

The combination of the vibration damper with a constant velocity joint has proved particularly advantageous. In this case, the constant velocity joint is mounted on the first or the second shaft part, for example, so as to be rotationally fixed in that it is mounted on the damper in a rotationally fixed manner, for example, by means of corresponding profiling, for example, on the rotary drivers already provided for acting upon the damping part, and is fixed axially, for example, crimped against an axial stop. In doing so, it can be advantageous if the preferably lubricated constant velocity joint is encapsulated relative to the damping part. Among other things, a sealing washer can be disposed between the constant velocity joint and the damping part in this connection. Advantageously, the sealing washer can also be made of a base part of the sleeve so that there is no requirement of any additional parts. The use of a constant velocity joint in the vibration damper enables large articulation angles to be maintained permanently in the shaft without damage to the damping part. Furthermore, a very good synchronous operation is achieved even at larger articulation angles. Similarly, it is possible to provide not only fixed ball joints but also constant velocity joints comprising slip joints and/or displacement units in the form of roller compensators.

According to a further advantageous illustrative embodiment, the vibration damper can additionally exhibit an axial damping effect in that the damping part is fixed or braced axially between the two shaft parts. In this case, the damping part may comprise axially elastic portions. These portions can be provided, in sandwich architecture, on one or both end faces and/or in between in that the damping part is divided into two or more sections or appropriately elastic regions are provided in the same. Alternatively or additionally, the damping part can be provided, on its end faces or in between, with one or more axially elastic damping washers that are acted upon in the case of axial loads by corresponding axial end faces of the shaft parts. The axial damping travel can be limited in that the shaft parts collide with each other in order to protect the axially elastically effective regions of the damping part from damage in the case of extreme stresses.

The invention also relates to a drive shaft that can be used in the form of a propeller shaft and/or a side shaft, for example, in a drive train of a motor vehicle, the drive shaft comprising rotationally locked end regions for achieving a rotationally locked connection of the drive shaft to additional connecting pieces of the drive train such as transmission output shafts, differential input or output shafts, wheel hubs and the like, and the vibration damper described above being disposed between the same. Within the scope of the invention, it is possible to provide an axial length compensation of the drive shaft at a distance from the vibration damper in the axial direction, which length compensation is in the form of, for example, a displacement unit comprising inner teeth disposed on a shaft section, an additional shaft section comprising outer teeth, and rolling elements disposed radially between the same. In one embodiment, a component of the displacement unit forms a structural unit with the vibration damper. In particular, the vibration damper in an additional embodiment comprises longitudinal teeth for the axial length compensation. In doing so, it has proved advantageous if the displacement unit or at least a component of the same is provided in the form of a structural unit with the vibration damper in that, for example, the outer teeth or preferably the inner teeth are provided on a shaft part of the vibration damper so that the number of shaft components can be reduced, for example, to three and the number of interruptions in the shaft can be minimized in favor of achieving a stability of the shaft.

BRIEF DESCRIPTION OF THE DRAWINGS

The invention will be described in further detail hereinafter with reference to illustrative embodiments shown in the accompanying drawing figures, in which:

FIGS. 7 and 7a show a cross-section of an additional variant of the damping part and an enlarged section thereof, respectively;

DETAILED DESCRIPTION OF ILLUSTRATIVE EMBODIMENTS

Figure 1:
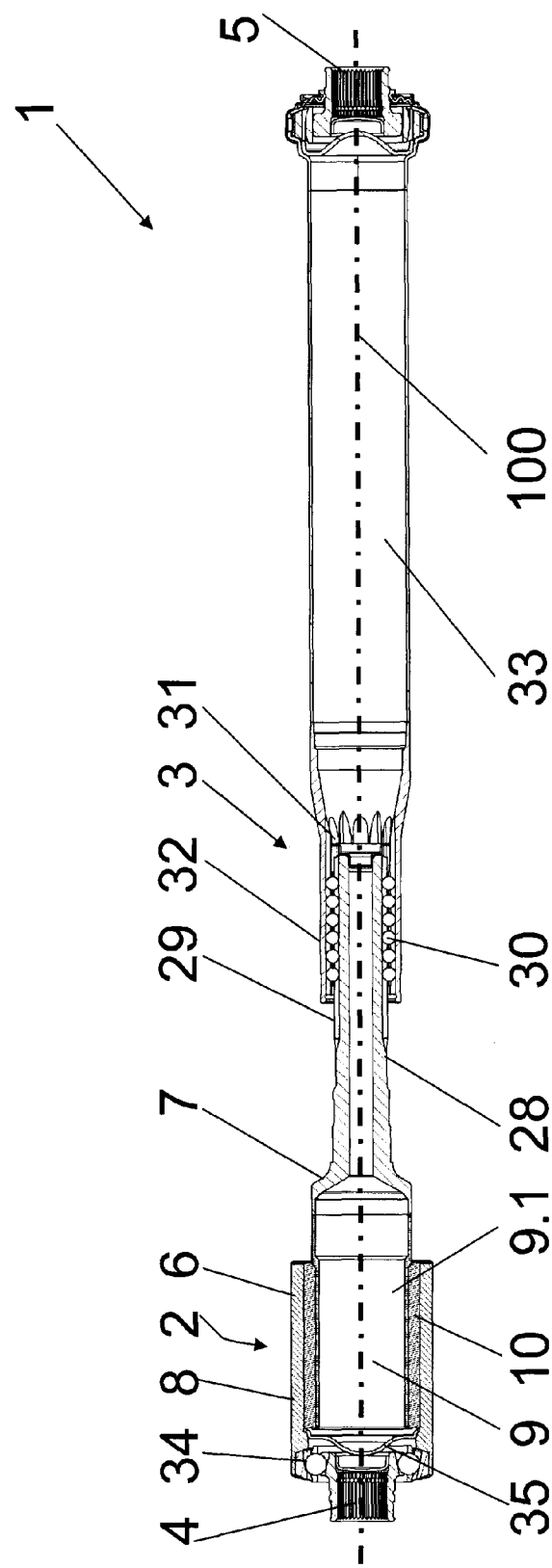
FIG. 1 shows a partial section of a drive shaft comprising a vibration damper of the invention.

FIG. 1 shows a drive shaft 1 comprising a vibration damper 2 and a linear displacement unit 3, and the rotation or longitudinal axis 100. The ends of the drive shaft 1 comprise connecting parts 4, 5, which are in the form of inner teeth and which enable a rotationally locked connection of the drive shaft to additional connecting pieces (not shown) such as wheel hubs or a differential gear on the one hand and inboard-mounted parts such as a transmission output shaft on the other.

The vibration damper 2 is integrated into the drive shaft 1 by means of the first and second shaft parts 6, 7. The first shaft part 6 is in the form of a sleeve 8, into which the inner part 9—or more particularly, the end region 9.1 of the inner part 9—of the second shaft part 7 is inserted axially. The damping part 10 is disposed radially between the sleeve 8 and the inner part 9, which damping part 10 is configured to be elastic or contains elastic elements. The sleeve 8 and the inner part 9 comprise rotary drivers for the damping part 10 so that the torque to be transmitted by the drive shaft 1 is transferred and peak torques occurring, for example, in the case of jerks in the drive, torsional vibrations and the like are filtered in that the peak torques effect an intermediate storage and/or elimination by conversion into heat in the damping part. Since the axial extension of the vibration damper 2 is usually not critical to the installation space, the outer circumference of the sleeve 8 can be limited to the extent that it is only slightly larger than the remaining diameter of the drive shaft. In special embodiments, the sleeve can have a diameter that is substantially identical to that of the drive shaft.

Figure 2:
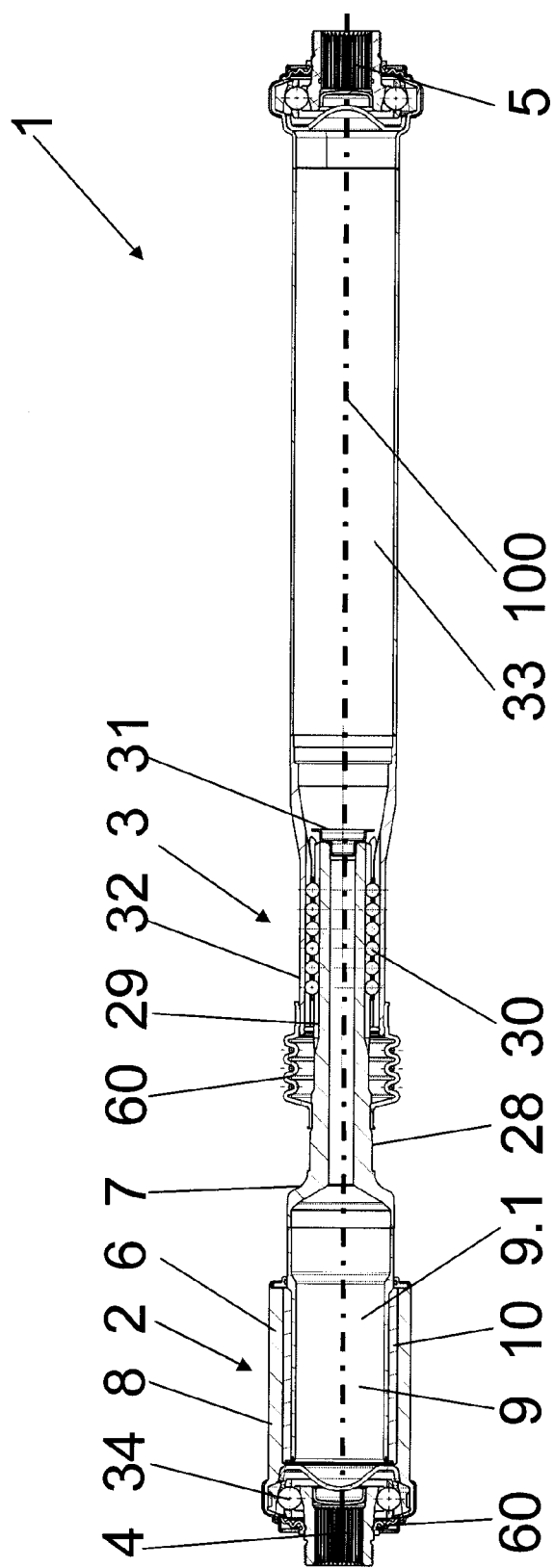
FIG. 2 shows a partial section of another embodiment of a drive shaft comprising a vibration damper of the invention.

FIG. 2 shows another embodiment of a drive shaft 1, in which seals 60 are provided, in particular.

Figure 3:
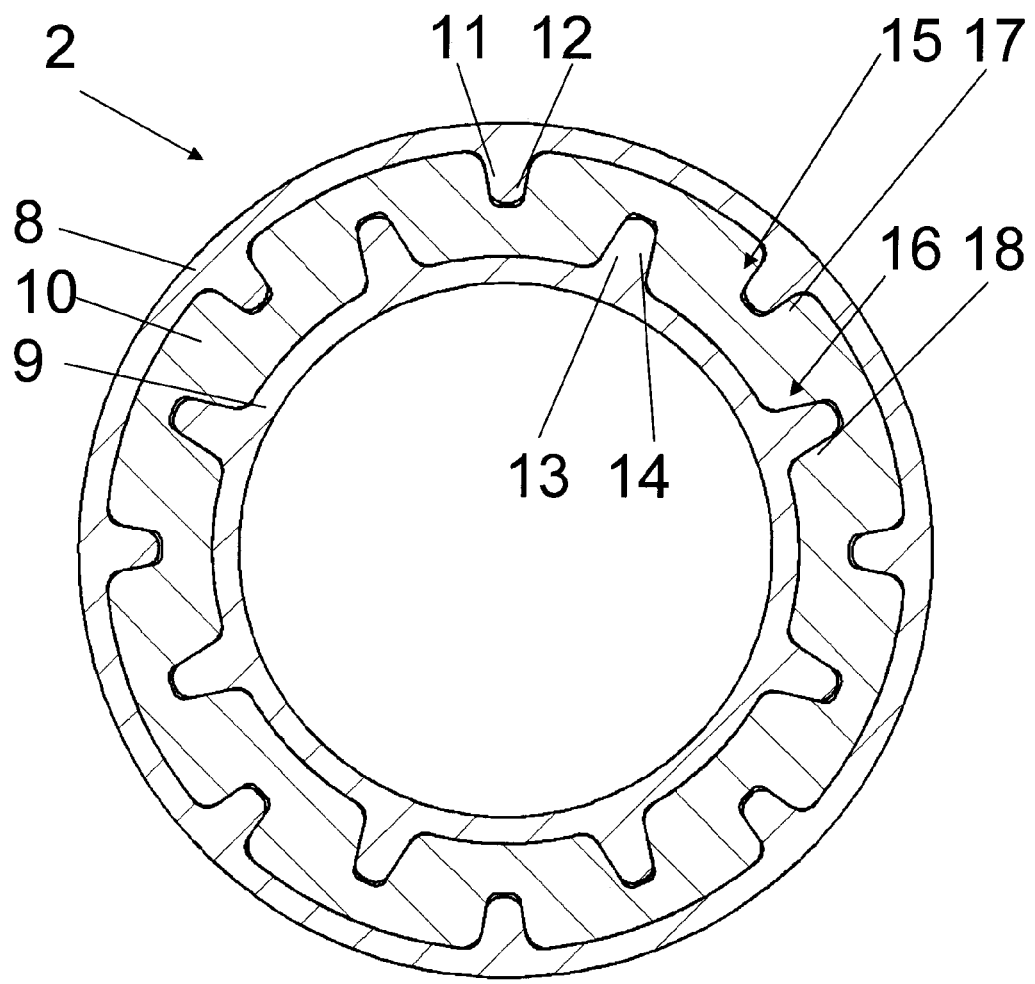
FIG. 3 shows a cross-section of a first variant of the vibration damper of the invention.

In order to explain the structure of the vibration damper 2, FIG. 3 shows a cross-section of the vibration damper comprising the sleeve 8 and the inner part 9 and the damping part 10 disposed radially in between. The sleeve 8, which is constructed, for example, of a metal and produced from an appropriately formed tubing comprises rotary drivers 11, which, in the illustrative embodiment shown, are in the form of ridge-like longitudinal ribs 12 extending radially inwardly and axially along the sleeve 8 but which in order to facilitate advantageous production, do not extend radially up to the inner part 9. Radially outwardly oriented rotary drivers 13 are provided in the form of longitudinal ribs 14 on the inner part 9 so as to be disposed around the circumference thereof in a staggered form relative to the rotary drivers 11. In the illustrative embodiment shown, there are eight longitudinal ribs 12, 14 that are distributed around the circumference of the sleeve and the inner part respectively. The damping part 10 is mounted in these longitudinal ribs 12, 14 in a rotationally locked manner. In this embodiment the damping part 10 comprises corresponding negative profiles 15, 16 that are constructed as longitudinal grooves 17, 18 which are slid onto respective longitudinal ribs 12, 14.

Of course it is possible to provide any other desired number of longitudinal ribs to meet geometric requirements and/or adjust a defined surface pressure in the case of given torques to be transmitted.

Figure 4:
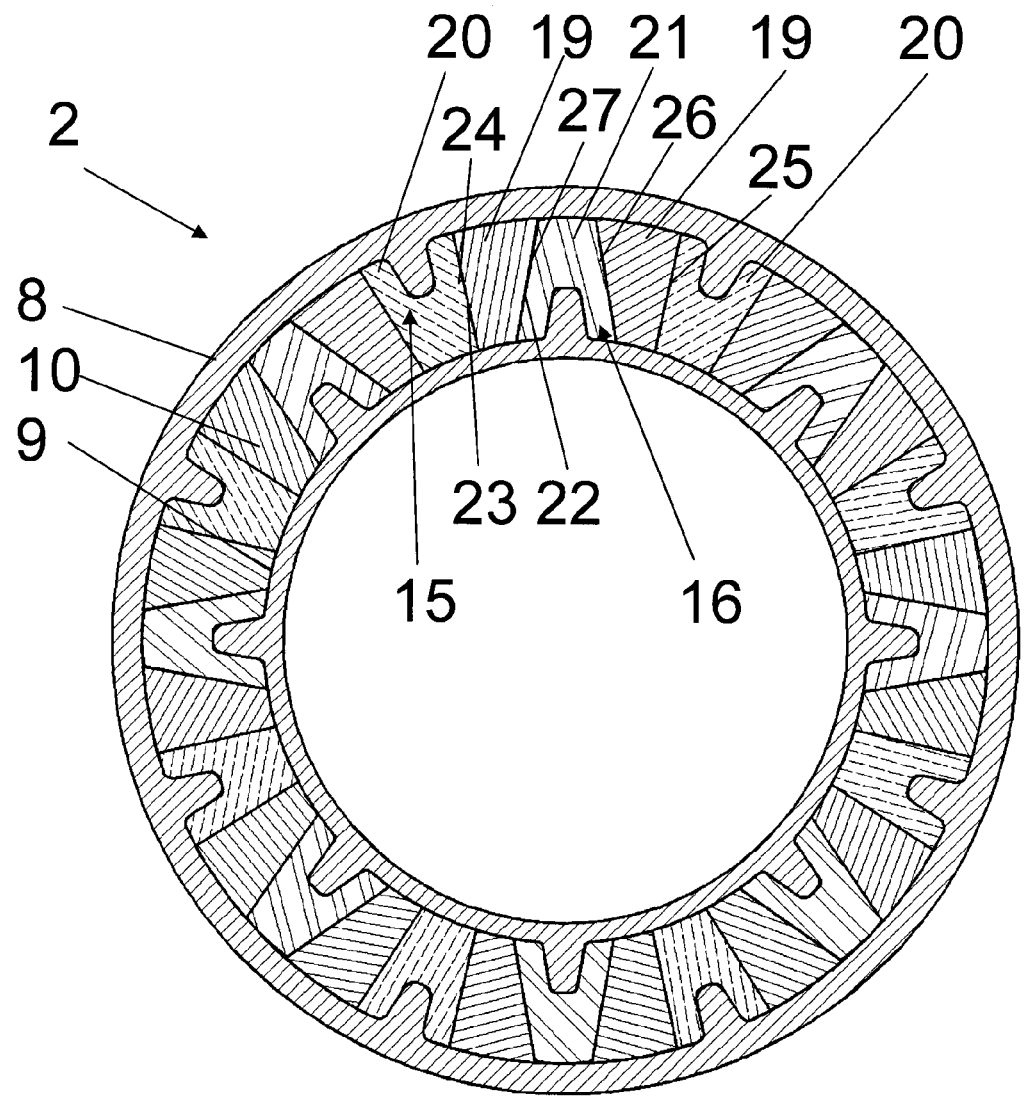
FIG. 4 shows a cross-section of a second variant of the vibration damper of the invention.

In a particularly advantageous embodiment, the vibration damper 2 shown in FIG. 4 has a layer composition of the damping part 10, in which layers 19, 20, 21 such as strips made of an elastic material or materials of varying elasticity are used so as to alternate with each other around the circumference of the damping part. In this case, the more elastic layer can be a soft plastic such as an elastomer, a rubber compound or the like or a mixture thereof. The one or more less elastic substances can be a light metal, a plastic, for example an elastomer of lesser elasticity, a thermoplastic resin or the like, it being possible to reinforce the plastics appropriately with fibers or other additions. Preferably, the damping part 10 is formed so as to be one-piece by means of a material bond, for example, a two-component injection-molding process, adhesion or optionally a bonding of rubber to metals or a form closure. The layers 20, 21 can also be made of the same material.

The layers 20, 21 of lesser elasticity form the negative profiles 15, 16, while the more elastic layers 19 bear by means of their boundary surfaces 22, 23 extensively against the counter-faces 24, 25, 26, 27 of the layers 20, 21. In this way, the longitudinal grooves 17, 18, due to their lesser elasticity, form abrasion-resistant surfaces and high surface pressure with the longitudinal ribs 12, 14, while the boundary surfaces 22, 23 of the layers 19, due to their larger surface, form lesser surface pressure with the counter-faces 24, 25, 26, 27, and the layers 20, 21 are therefore protected effectively from wear so that the proposed vibration damper 2 exhibits strength in the long term and enables high transmission of torque.

As shown in FIG. 1, there is a constant velocity joint 34 integrated into the vibration damper 2, which constant velocity joint 34 may be lubricated. In order to prevent a discharge of lubricant in the direction of the damping part 10, a sealing washer 35 is disposed between the damping part 10 and the constant velocity joint 34.

In order to form the displacement unit 3, there is an axial extension 28 formed integrally on the inner part 9 of the vibration damper 2, which axial extension 28 comprises longitudinal teeth 29 that extend radially outwardly and are intended for receiving rolling elements 30 that are disposed so as to be axially displaceable by means of the inner teeth 31 of the sleeve-shaped tab 32 of the shaft part 33.

Figure 5:
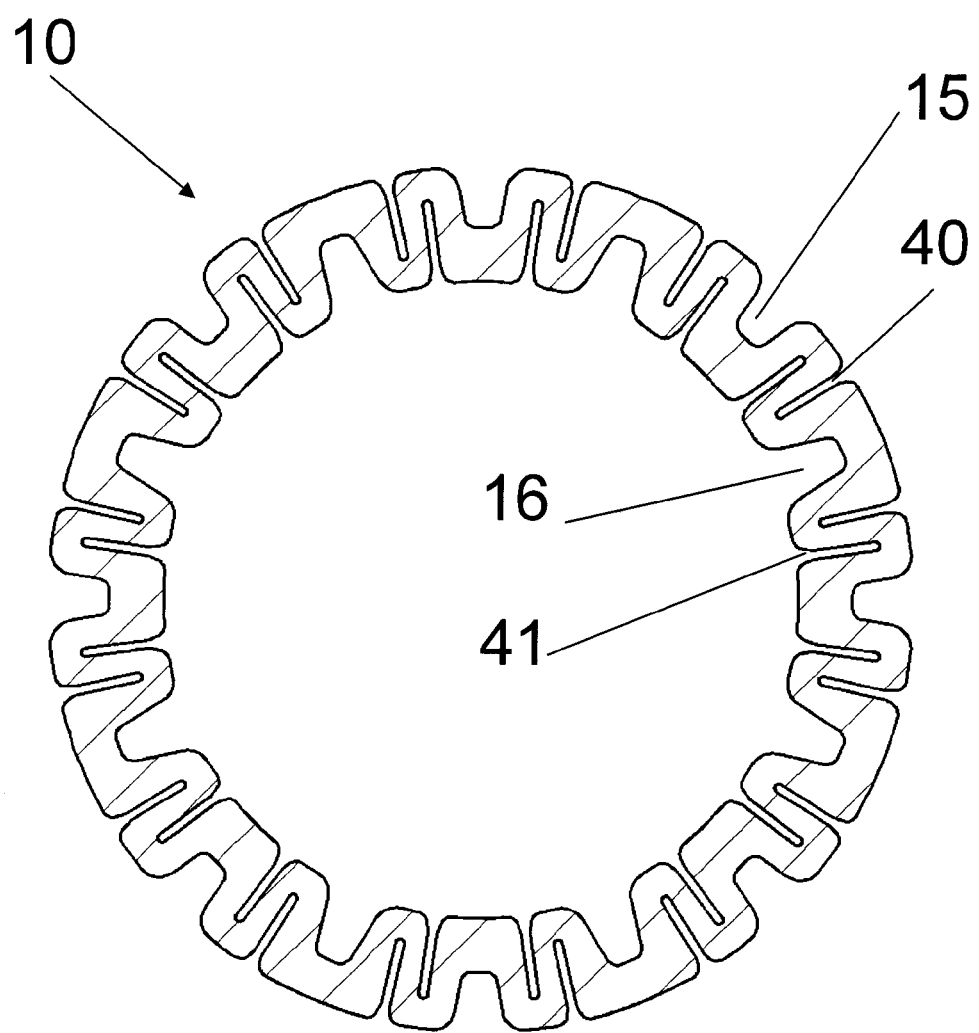
FIG. 5 shows a cross-section of a variant of the damping part.

Two recesses 40, 41 are provided between every two negative profiles 15, 16 in the damping part 10 shown in FIG. 5. The negative profiles 15, 16 and the recesses 40, 41 open up in different directions directly alternating with each other. That is, a negative profile 15 that opens out outwardly, thus, in the direction of the sleeve (not shown here) is followed by an inwardly opening recess 41 that is followed by an outwardly opening recess 40. This is then followed by an inwardly opening negative profile 16 around the circumference of the damping part 10. The negative profiles 15, 16 in this embodiment are clearly broader than the recesses 40, 41. The advantage of such recesses 40, 41 or slots is that the torsional rigidity and the damping effect can be adjusted. In terms of design, it is particularly necessary to ensure that regions, in which high stresses occur, do not overlap with or do not overlap substantially with other functional regions such as the drive slots of the negative profiles 15, 16. In general, the recesses 40, 41, more particularly the geometry and number thereof, or, for example, also the rings or elements that are yet to be described and have varying rigidity can thus influence the characteristic of the damping part 10 and thus also of the entire decoupling element in a targeted manner. It has been observed that if at least two recesses are provided between two negative profiles, the region between the recesses is subjected to bending stresses so that relatively large distances can be achieved at relatively low stresses. If the negative profiles 15, 16 have a smaller depth than the recesses 40, 41, that is, if they are located at a higher level in the direction of the respective outer surface of the damping part 10, then they are located outside the stressed zone and only low stresses result. It is thus possible to prevent rotational backlash from developing prematurely as a result of creep. When torque is applied, one side is subjected to pressure and one side is subjected to tensile stress, as a result of which the load is distributed. At the same time, when torque is applied, a relatively large volume of the damping part is stretched and squashed, which leads to greater absorption of deformation energy, which results in greater damping effect.

Figure 6:
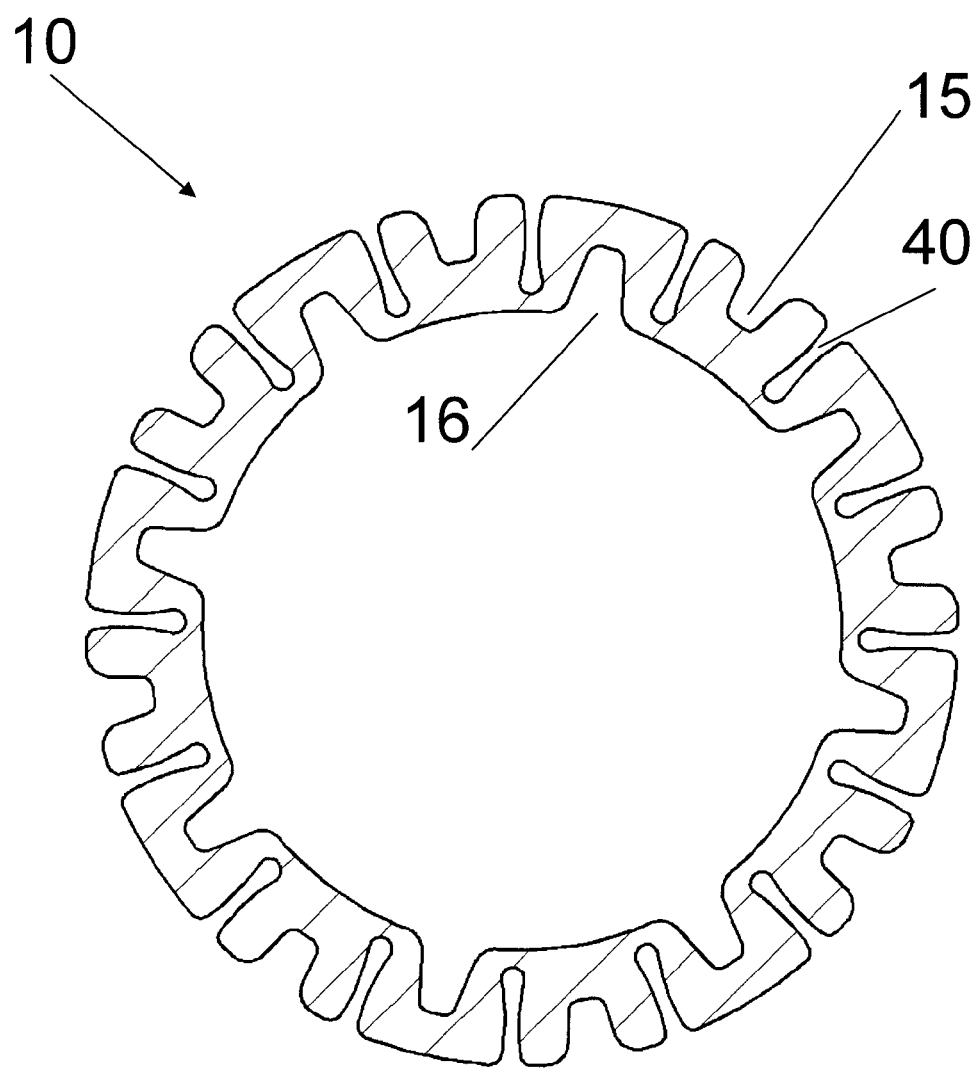
FIGS. 6 and 6a show a cross-section of another variant of the damping part and an enlarged section thereof, respectively.
Figure 6A:
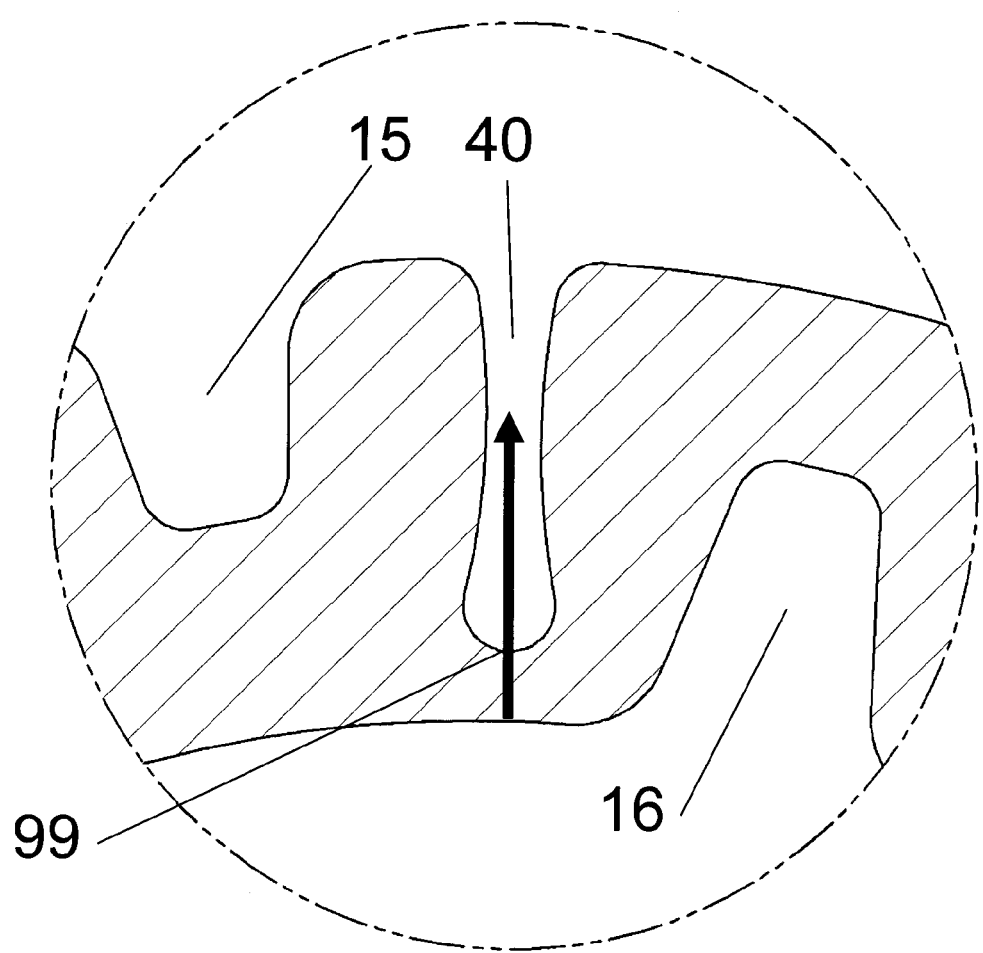

The damping part 10 of the variant shown in FIG. 6 only has recesses 40 that open out outwardly, that is, in the direction of the sleeve. By virtue of the recesses 40 in these embodiments, peak stresses resulting from repeated loads are reduced so that the fatigue strength increases. As can be seen particularly in the enlarged section shown in FIG. 6a, the recesses 40 comprise a slightly broader portion in the direction of their base, that is, in the direction of the inner part (not shown here). Furthermore, the recesses 40 extend substantially in the direction of the surface normal 99 of the damping part 10 drawn here starting from the inner edge of the damping part 10.

Figure 7:
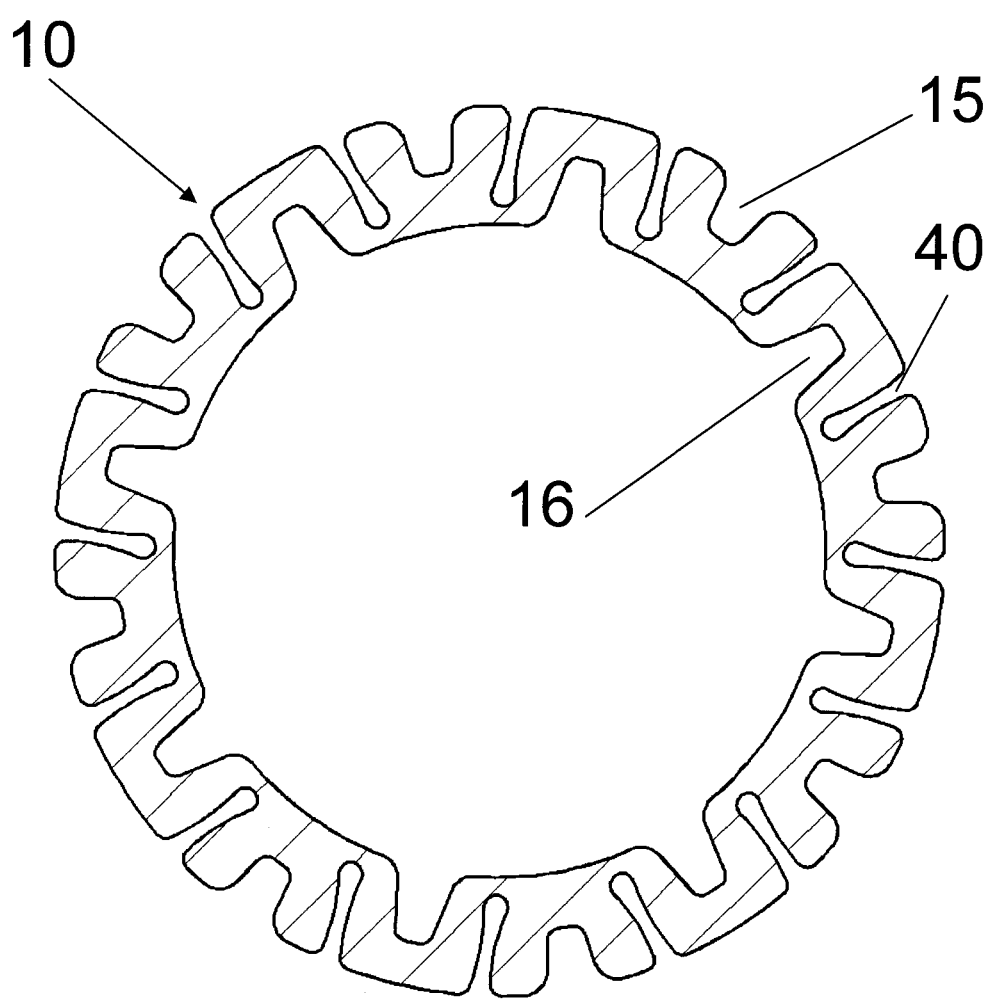

In the variant shown in FIG. 7 and the enlarged section shown in FIG. 7a, it can be seen that the recesses 40 are inclined relative to the surface normal 99, and they are oriented particularly toward the region located below the negative profiles 15 that open out outwardly, that is, in the direction of the sleeve (not shown here). When these inclined recesses 40 are provided, the material of the damping part 10 is prevented from being overstressed in the case of short-term peak loads in that the recesses 40 close due to the load and the forces to be transmitted travel through these bearing surfaces.

Figure 8:
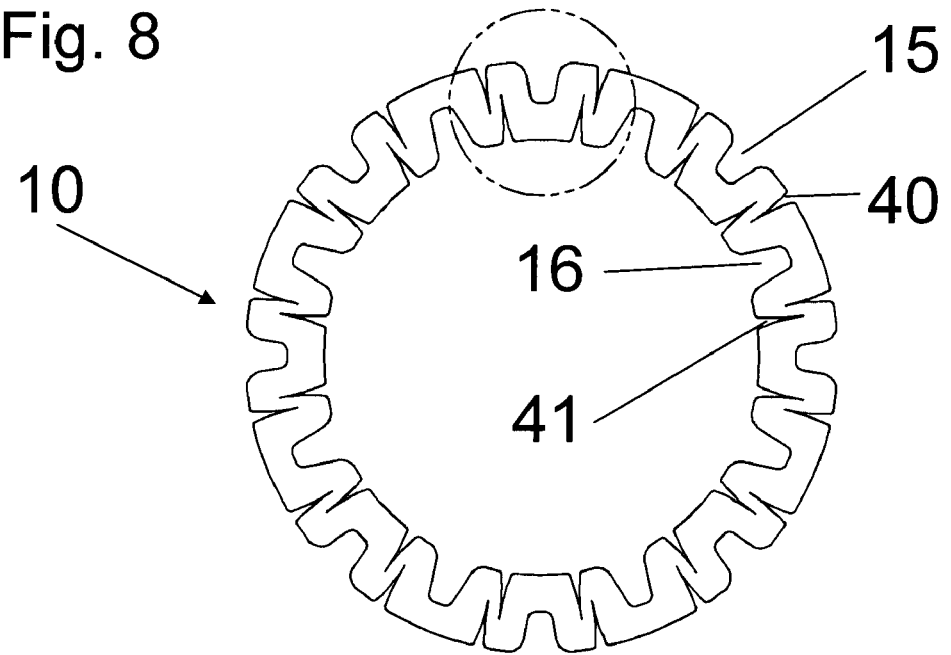
FIGS. 8 and 8a show a cross-section of an additional variant of the damping part and an enlarged section thereof, respectively.
Figure 8A:
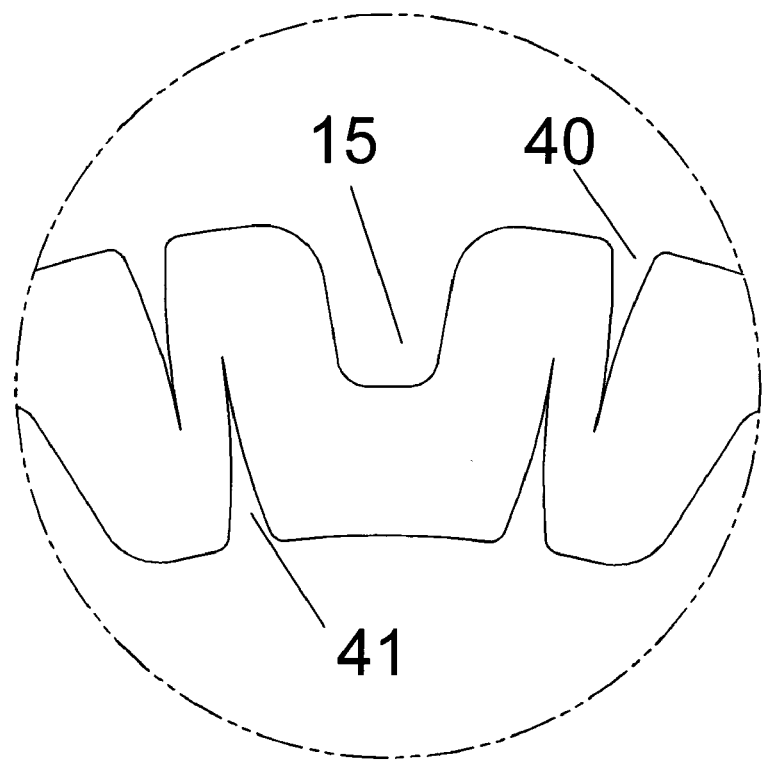

If the recesses 40, 41 of the preceding variants had a substantially constant width, then FIG. 8 and its enlarged section shown in FIG. 8a show a variant, in which the recesses 40, 41 spread out in the direction of their opening or they become more slender or narrow in the direction of their base. These recesses 40, 41 constantly close in the direction extending from the base when subjected to stress. For reducing the notching effect in the base of the recesses, the same can further be provided with a pressure-relief hole.

Figure 9:
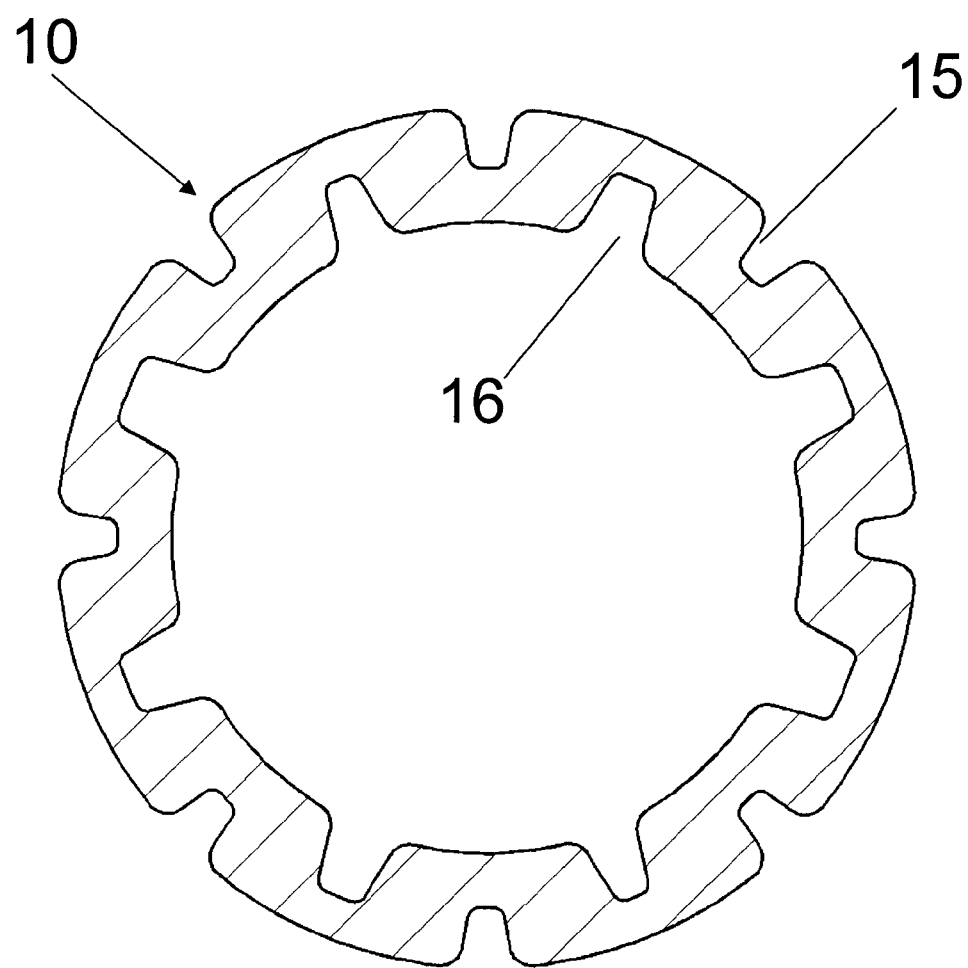
FIG. 9 shows a cross-section of a supplementary variant of the damping part.

The variant shown in FIG. 9 illustrates the design of the negative profiles 15, 16. In this case, this damping part 10 can also be provided with recesses accordingly. The recesses are not provided here for the sake of clarity. The negative profiles 15, 16 have varying widths. This feature relates to whether the negative profiles 15 open out in the direction of the sleeve or whether the negative profiles 16 open out in the direction of the inner part or whether the negative profiles open out in the same direction, here particularly in the direction of the inner part. These variably broad negative profiles 15 follow one behind the other under stress and come into contact with the inner part or the drive elements thereof in dependence of the increasing torsion angle between the inner part and the sleeve.

Figure 10:
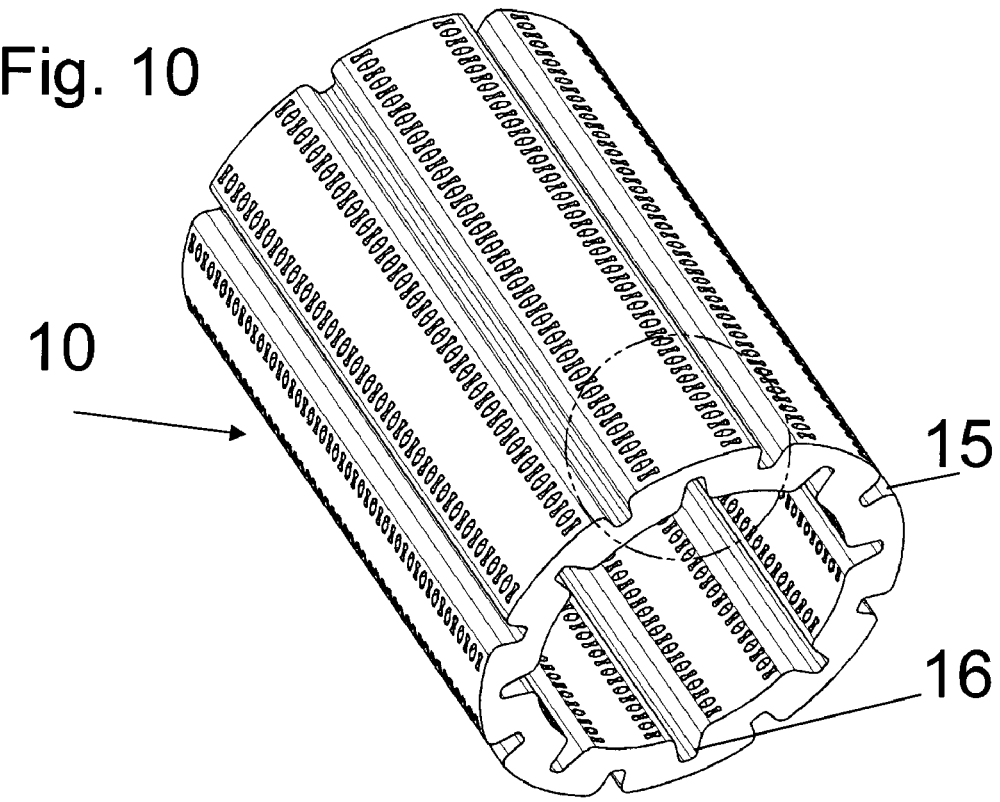
FIGS. 10 and 10a show a spatial representation of a damping part and an enlarged section thereof, respectively.
Figure 10A:
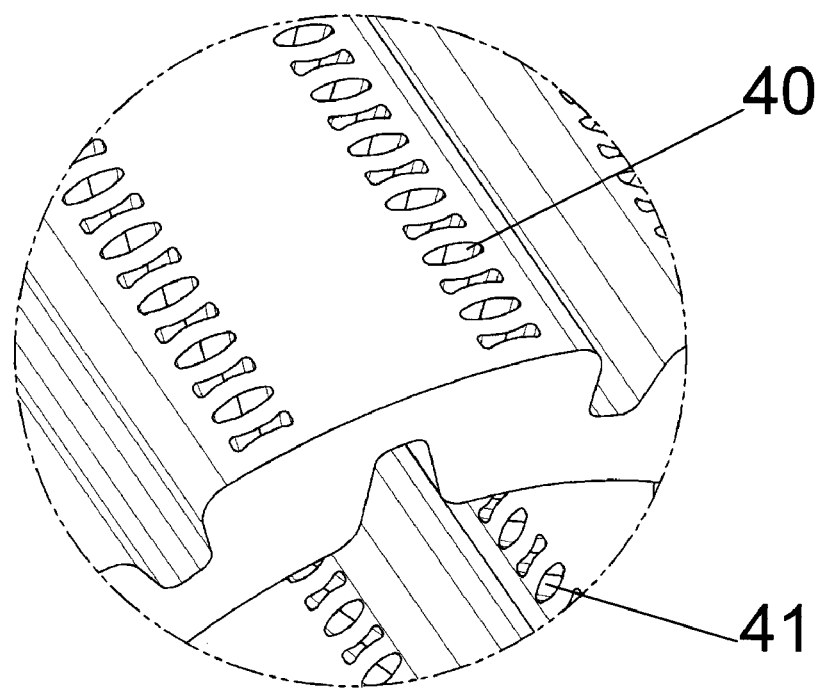

The recesses 40, 41 of the variant shown in FIG. 10 and the enlarged section shown in FIG. 10a are radially continuous through the wall of the damping part 10 so that curved material webs of the damping part 10 are formed. Under stress, these material webs can then buckle laterally. Protection from overload can further be provided in that the buckled material webs bear against their respective adjacent web. In the example shown here, the recesses are configured to be concave or convex on both sides in the cross-section.

Figure 11:
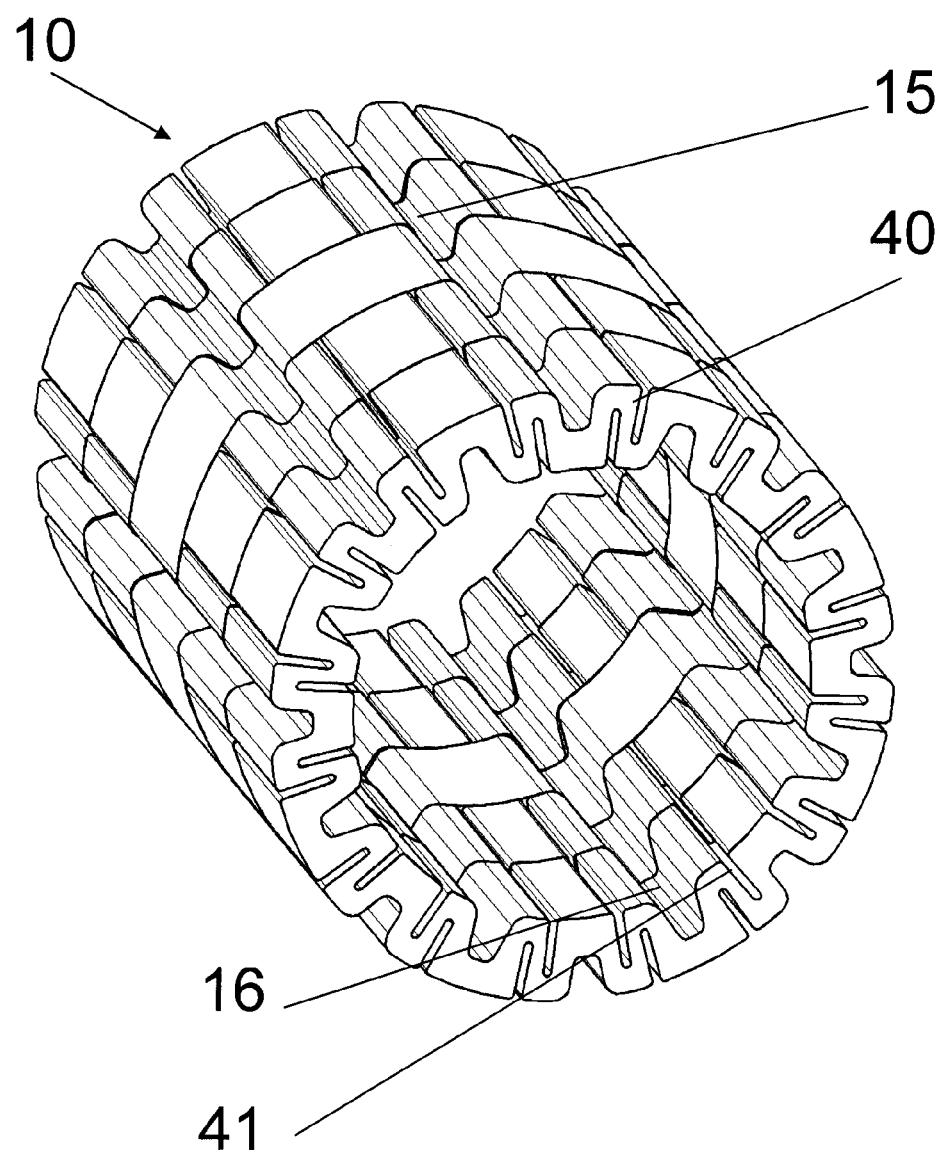
FIGS. 11 and 11a show a spatial representation of another embodiment of a damping part and an enlarged section thereof, respectively.
Figure 11A:
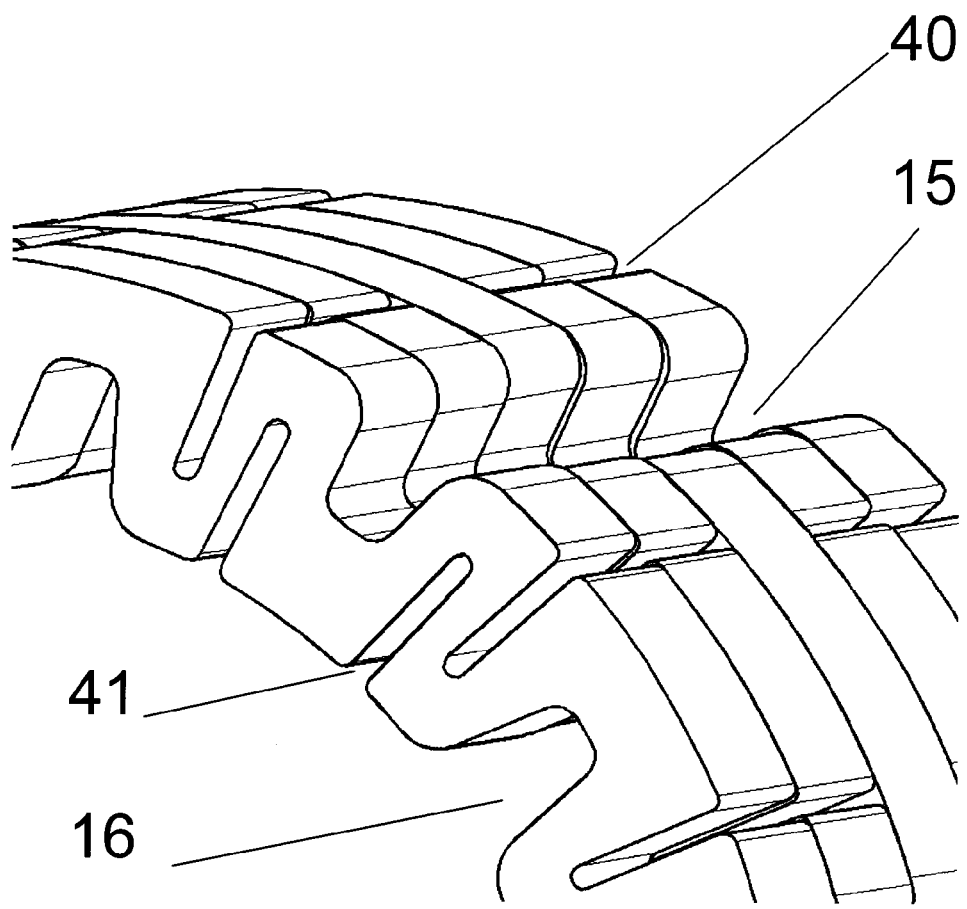

FIG. 11 and its enlarged section shown in FIG. 11a show a damping part 10 that is made of rings disposed one behind the other. Five rings are provided in this example. These rings can have substantially identical or also different material properties. For example, they can exhibit varying rigidity. The rings are configured here such that continuous negative profiles 15, 16 are formed. As can be seen particularly in the enlarged section shown in FIG. 11a, the central ring does not have recesses so that the recesses 40, 41 of the damping part 10 are not continuous on the whole, but instead interrupted. In further embodiments, the other rings are also provided with different geometries. Moreover, it is also possible, by dimensioning the width of the negative profiles 15, 16, to adjust the engagement of the individual rings depending on the torsion angle and thus the stress. One advantage of the structure composed of rings or strips (FIG. 4) is that it is thus possible to combine different materials without requiring complex production processes. It is also possible to implement the modular design principle so that a wide variety of designs can be achieved with a small number of different parts.

Figure 12:
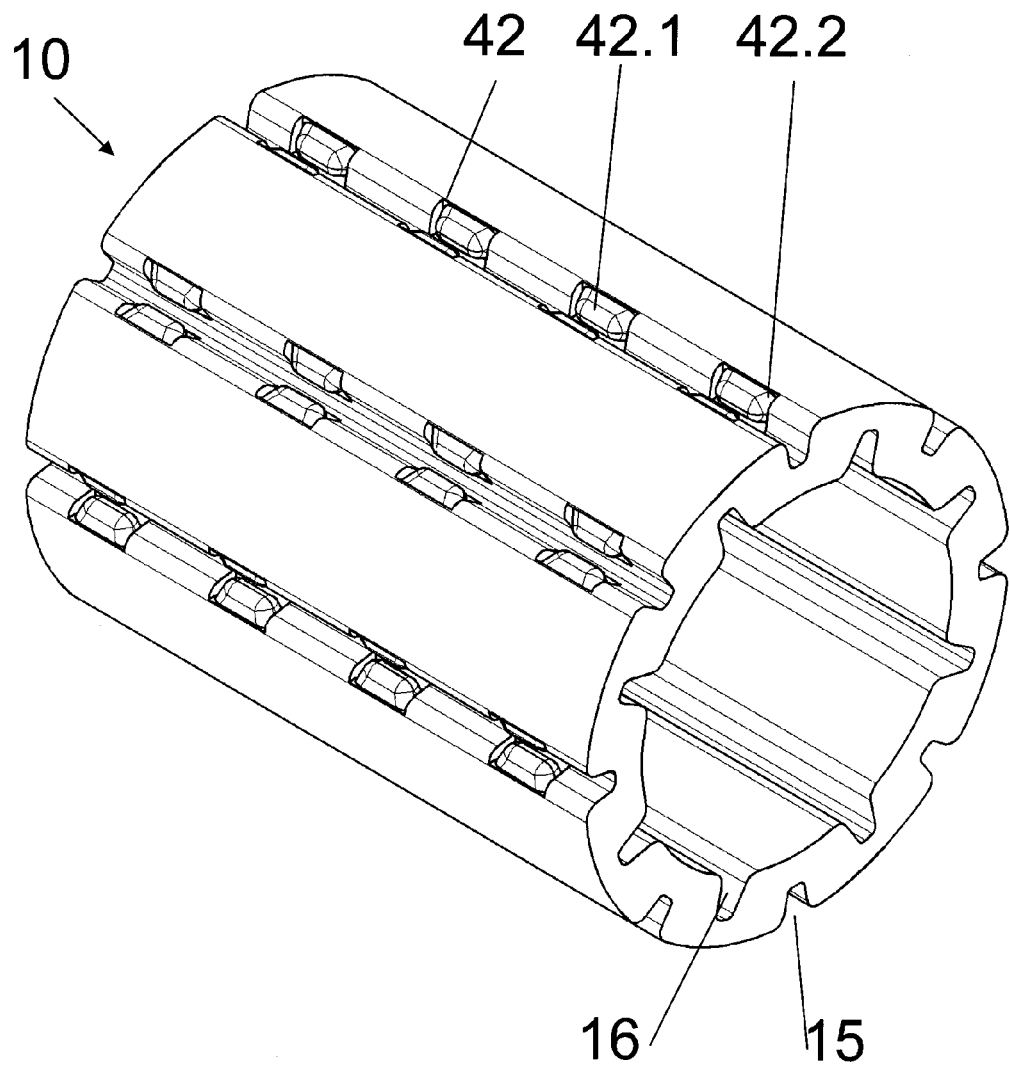
FIG. 12 shows a spatial representation of an additional embodiment of a damping part.

In the damping part 10 shown in FIG. 12, the recesses 42 are in the form of pockets that are connected laterally to negative profiles 15 which open out outwardly, that is, in the direction of the sleeve in the installed state. These recesses 42 in the side walls of the negative profiles 15 are filled with a filler 42.1 here, the filler 42.1 in this example being softer than the material of the damping part 10. The recesses 42 further comprise a displacement space 42.2, into which the filler 42.1 is pressed under stress.

Figure 13:
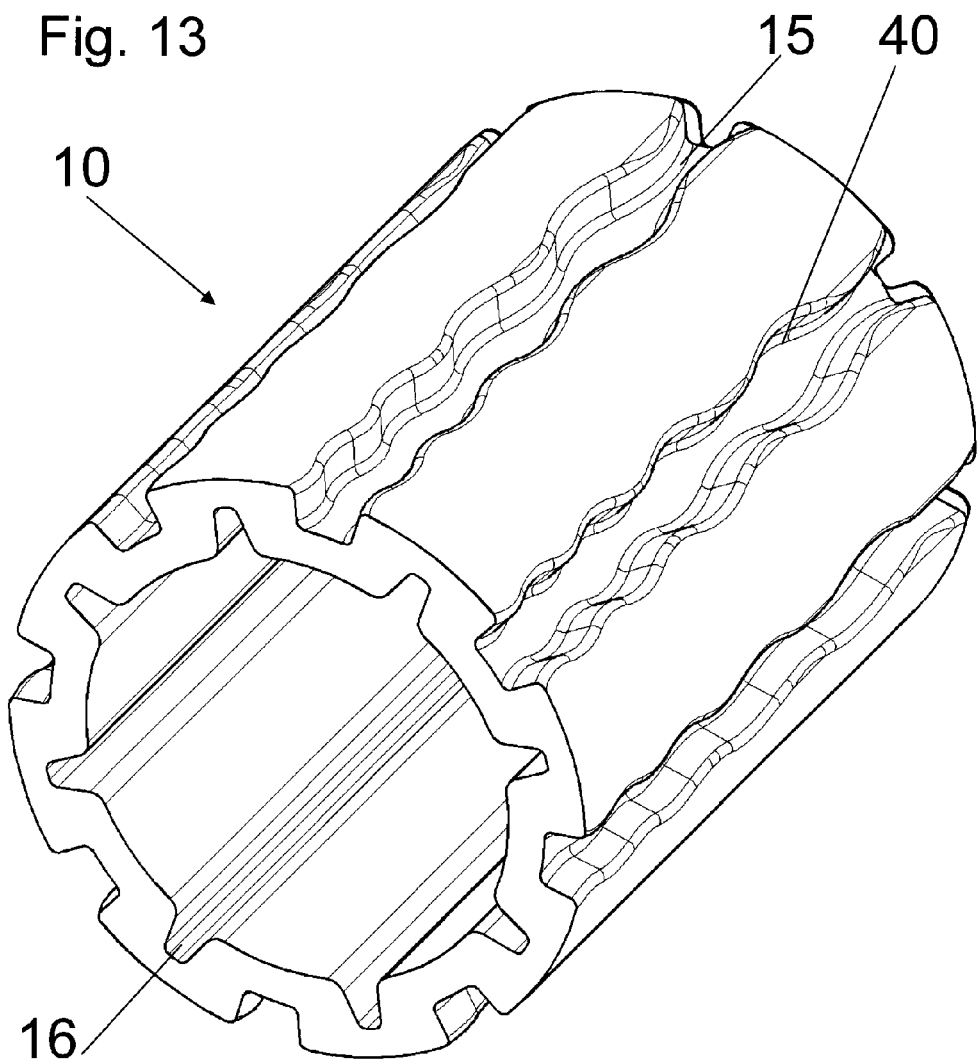
FIG. 13 shows a spatial representation of an additional embodiment of a damping part.

The damping part 10 shown in FIG. 13 has undulated negative profiles 15, that is, the side walls of the negative profiles 15 deviate from a straight course in the axial direction, that is, along the rotation axis. At the same time, recesses 40 are formed as a result of the deviation. As a result of the undulation, there is line contact in the unstressed state, which line contact becomes an increasingly large surface as the load increases.

In general, in all embodiments a layer of a soft material can be provided, more particularly a material that is softer than that of the damping part in the surfaces that come into contact during force transmission. Consequently, a contact does not lead to a hard transition in the characteristic.

The embodiments comprise damping parts that are formed integrally or are made of rings or strips disposed side by side in the radial direction. In doing so, the materials used can be identical or different. Moreover, provision is made, in part, for recesses that are substantially identical or different for a damping part. All embodiments can be combined with each other, in particular.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A vibration damper for a drive shaft of a drive train, said drive shaft comprising a first shaft part, a second shaft part, and an elastically deformable damping part which is disposed between the first and second shaft parts and which is engaged by said first and second shaft parts in a rotationally locked manner;

the first shaft part comprising a sleeve provided with radially inwardly oriented rotary drivers for the damping part;

the second shaft part comprising an inner part provided with radially outwardly oriented rotary drivers for the damping part;

said sleeve and said inner part being constructed and arranged such that an end region of the inner part is surrounded by the sleeve, and said damping part being disposed radially between the sleeve and the inner part and around said end region of said inner part, and comprising negative profiles in which respective rotary drivers of said sleeve and said inner part are received;

wherein said damping part has an inhomogeneous structure or a discontinuous geometry, said damping part is constructed of at least two rings disposed one behind the other in the axial direction, said at least two rings have different elasticities, and said at least two rings are provided with different geometries.

2. The vibration damper as claimed in claim 1, wherein the damping part further comprises recesses in addition to the negative profiles.

3. The vibration damper as claimed in claim 2, wherein said recesses are in the form of grooves and are configured to open in the direction of the sleeve.

4. The vibration damper as claimed in claim 2, wherein said recesses are in the form of grooves and are configured to open in the direction of the inner part.

5. The vibration damper as claimed in claim 2, wherein said recesses are in the form of grooves and have a greater radial depth than the negative profiles.

6. The vibration damper as claimed in claim 2, wherein said recesses are in the form of grooves and are interrupted along the rotation axis.

7. The vibration damper as claimed in claim 6, wherein the rotary drivers and the respective negative profiles associated with each of the rotary drivers are constructed complementary to each other such that a variable play between the respective rotary drivers and negative profiles is produced.

8. The vibration damper as claimed in claim 2, wherein said recesses are in the form of pockets abutting the negative profiles in the axial direction.

9. The vibration damper as claimed in claim 1, wherein the rotary drivers comprise longitudinal ribs that extend along the rotation axis of the vibration damper and that engage with negative profiles comprising complementary longitudinal grooves in the damping part.

10. A drive shaft comprising connecting parts disposed at each end thereof for connection to parts of a vehicle drive train and a vibration damper as claimed in claim 1 disposed between said connecting parts.

\* \* \* \* \*